(No Model.) 3 Sheets—Sheet 1.

E. JORDAN.
SEAMING MACHINE.

No. 314,336. Patented Mar. 24, 1885.

Attests:
J. H. Templin.
F. Rudolph.

Inventor:
Edmund Jordan
by E. W. Bliss Atty.

(No Model.) 3 Sheets—Sheet 2.

E. JORDAN.
SEAMING MACHINE.

No. 314,336. Patented Mar. 24, 1885.

Attests:
J. H. Templin
F. Rudolph

Inventor
Edmund Jordan
by E W Bliss, Atty.

(No Model.)  
3 Sheets—Sheet 3.
E. JORDAN.
SEAMING MACHINE.
No. 314,336. Patented Mar. 24, 1885.
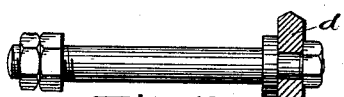
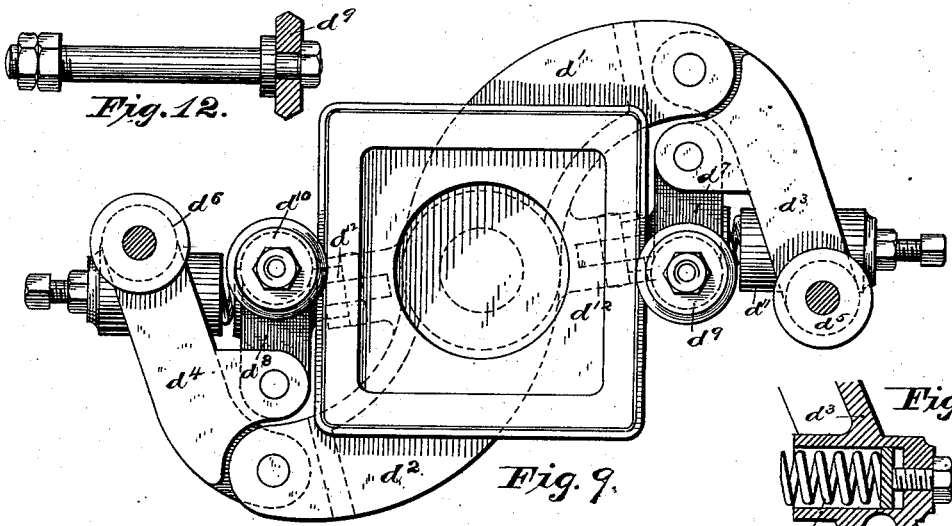
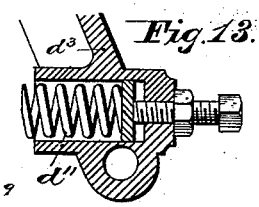
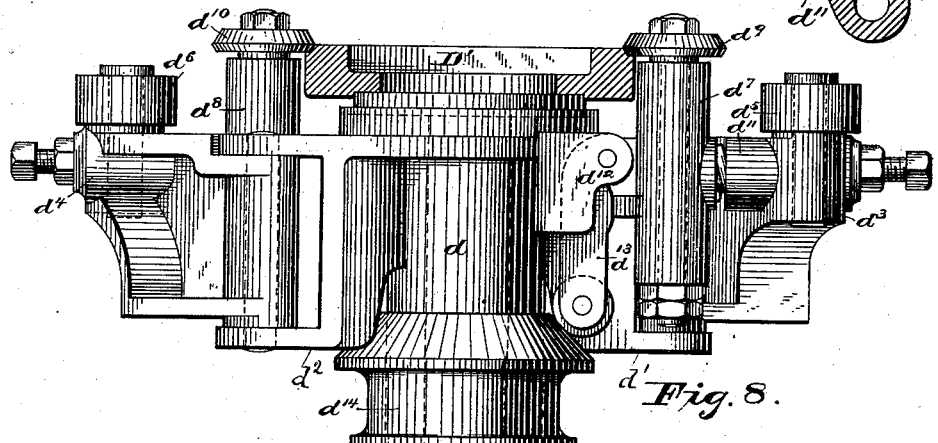
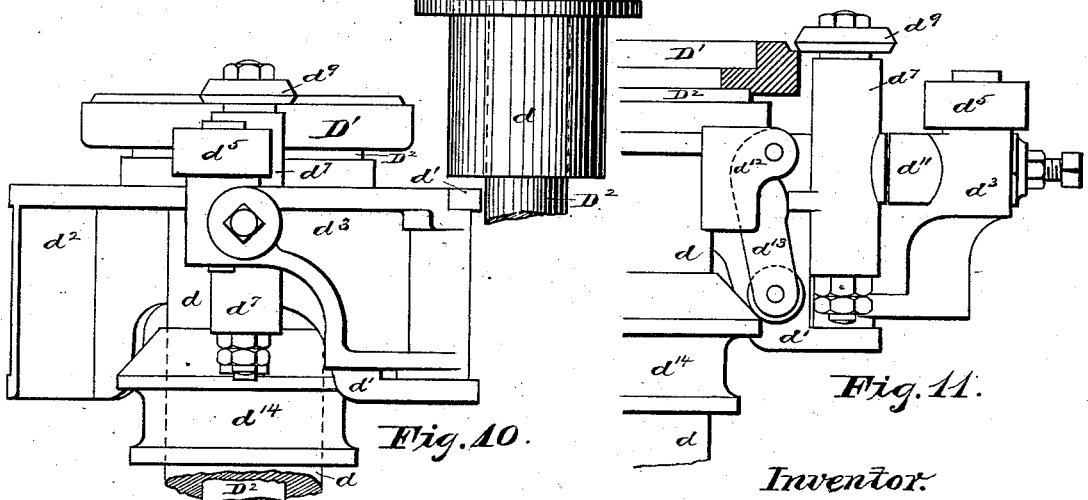
Witnesses:
J. H. Templin.
F. Rudolph.
Inventor:
E. Jordan.
N. PETERS. Photo-Lithographer, Washington, D. C.

UNITED STATES PATENT OFFICE.

EDMUND JORDAN, OF BROOKLYN, NEW YORK, ASSIGNOR TO E. W. BLISS, OF SAME PLACE.

SEAMING-MACHINE.

SPECIFICATION forming part of Letters Patent No. 314,336, dated March 24, 1885.

Application filed November 26, 1884. (No model.)

*To all whom it may concern:*

Be it known that I, EDMUND JORDAN, of Brooklyn, in the county of Kings, State of New York, have invented an Improvement in Seaming-Machines for Closing the Seams on the Ends of Sheet-Metal Cans; and I do hereby declare the following to be a full, clear, and exact description thereof, which will enable others skilled in the art to make and use the same, reference being had to the accompanying drawings, forming part of the specification.

My invention consists of a seaming-machine for closing the head-seams upon sheet-metal cans.

It consists in mechanism whereby the seaming-rolls are caused to travel in contact with the head-seam throughout of whatever exterior the seam may be, the can-body remaining stationary, and consists in the mechanism hereinafter more fully described and claimed.

Figure 1:
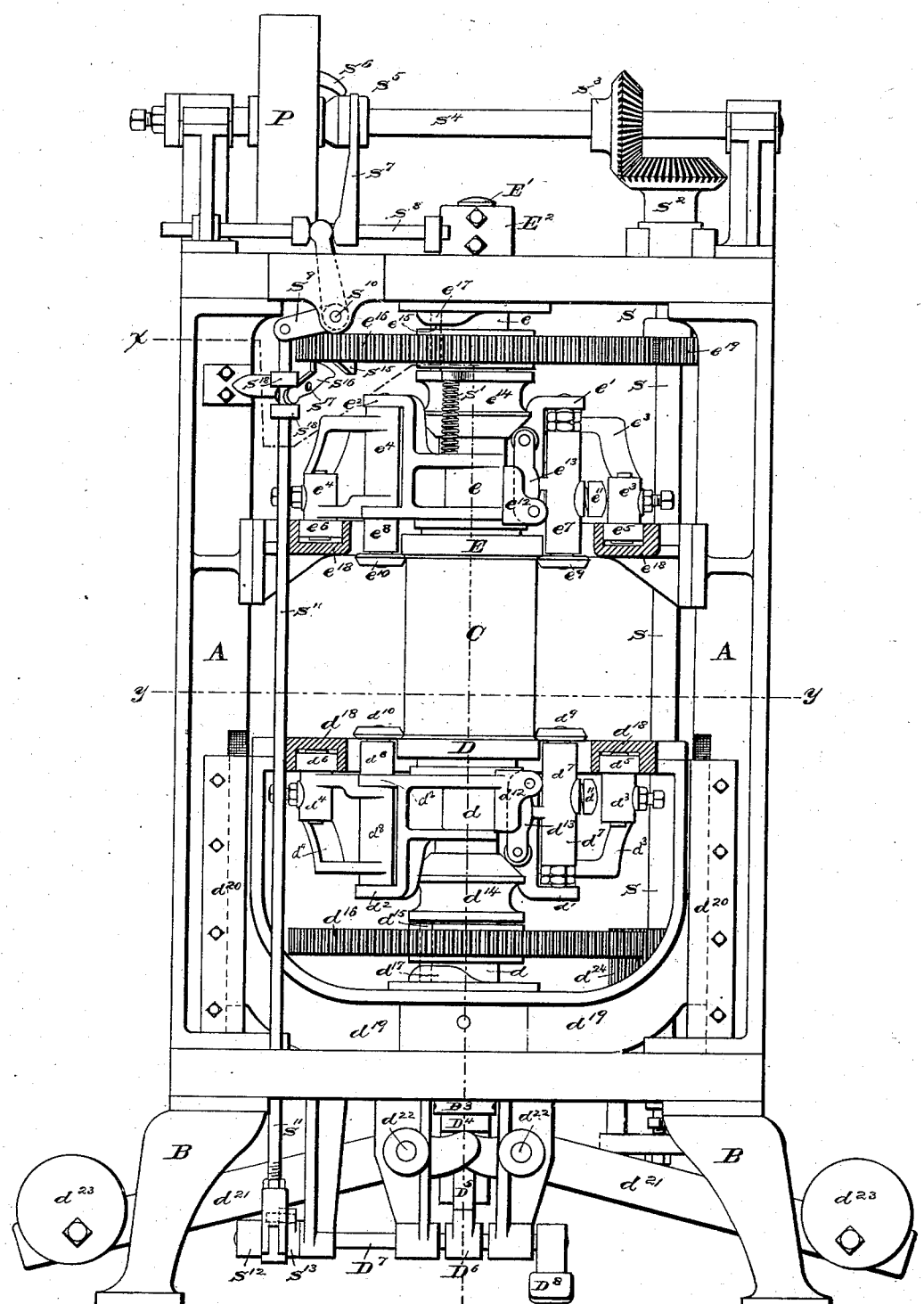
Figure 2:
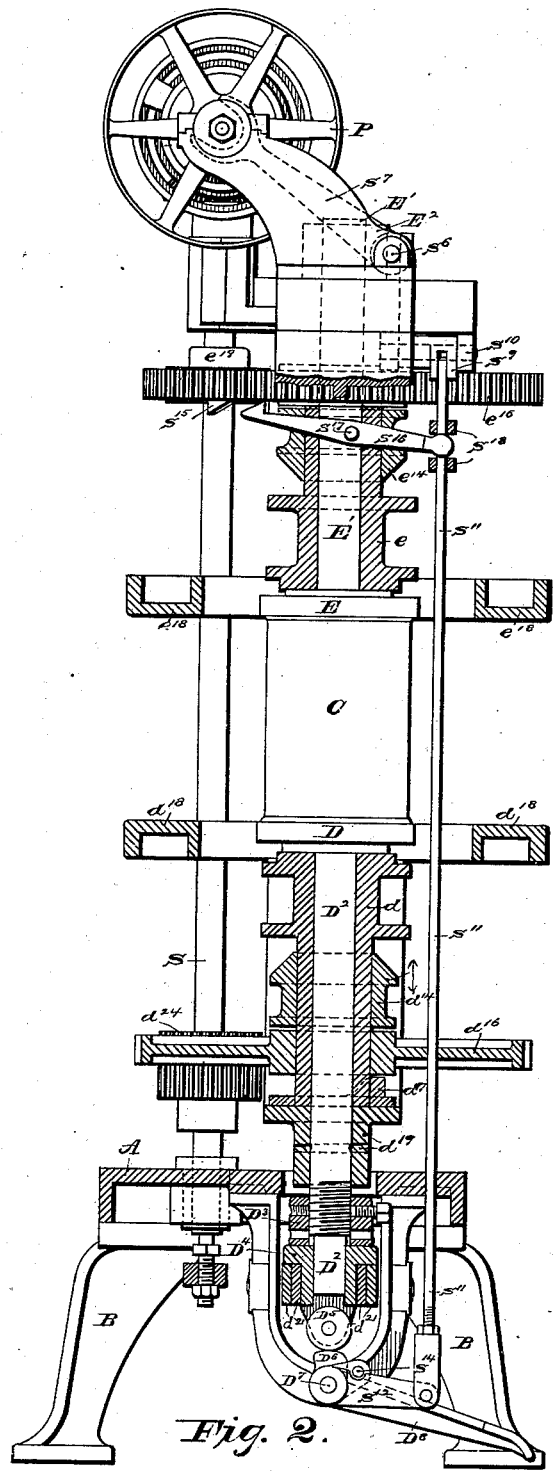
Figure 3:
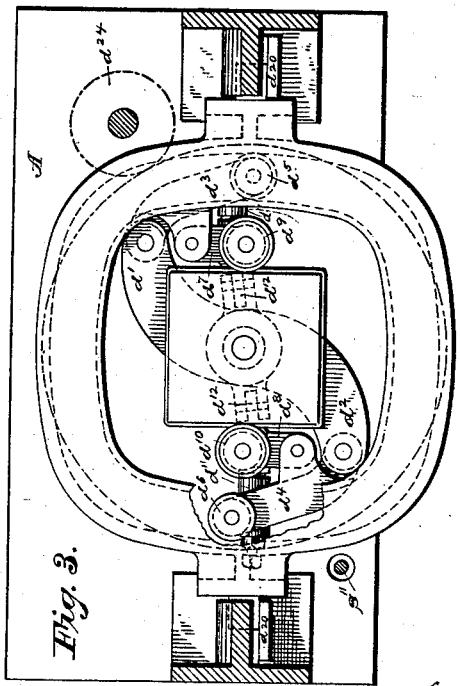
Figure 4:
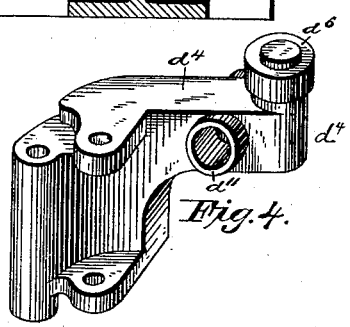
Figures 6, 7:
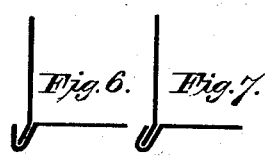
Figure 5:
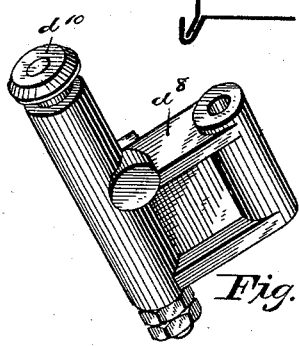

In the accompanying drawings, Figure 1 represents a front view of the machine. Fig. 2 is a vertical section of the same, taken at line $x\ x$, Fig. 1. Fig. 3 is a horizontal section taken at line $y\ y$, Fig. 1. Fig. 4 is a perspective view of a link carrying the guide or can-roll. Fig. 5 is a perspective view of a secondary link carrying the seaming-rolls. Fig. 6 is a sectional view of the seam before it has been operated on, and Fig. 7 is the same view after the seam has been operated on. Fig. 8 represents a view of the seaming-rolls and cams and the mechanism for operating the seaming-rolls, and a section of one of the clamping-disks. Fig. 9 is a top view of Fig. 8. Fig. 10 is an end view of Fig. 11. Fig. 11 represents a portion of Fig. 8, showing the seaming-rolls moved outward to clear the plate. This is accomplished by the upward movement of the conical sleeve. Fig. 12 is a section view of a seaming-roll and the spindle upon which it revolves. Fig. 13 is a section of the pocket in the end of the cam-roll-supporting links, containing a compression-spring for keeping the seaming-roll to its work.

Having described my invention by reference to the figures illustrated in the accompanying drawings, I will now proceed to describe it by reference to the letters marked thereon, in which similar letters of reference refer to corresponding parts throughout.

A represents the frame mounted on legs B.

C represents a sheet-metal can in position to be operated on.

E represents the stationary centering and clamping disk fitted to the required shape.

D represents the lower centering and clamping disk fitted to the required shape. This disk is rigidly attached to the upper end of the movable stud $D^2$, both having an intermittent vertical motion for centering, clamping, holding, and releasing the can when the seam has been closed. To accomplish this an adjusting-nut, $D^3$, is provided on the lower portion of the movable stud, against which a sleeve carrying an anti-friction roll rests.

$D^4$ is the sleeve, and $D^5$ the roll. The roll works on a cam.

$D^6$ represents the cam which is attached to rock-shaft $D^7$, which is operated by treadle $D^8$.

$d$ represents an intermittently-revolving sleeve adapted to rotate on stud $D^2$. On this sleeve are two arms, $d'$ and $d^2$, Fig. 3. Each arm carries a link pivoted in it. $d^3$ and $d^4$, Figs. 3 and 4, represent these links.

$d^5$ and $d^6$ represent cam or guide rolls which are pivoted in the ends of links $d^3$ and $d^4$. These cam or guide rolls travel in a cam-groove hereinafter described.

$d^7$ and $d^8$ are secondary links pivoted to links $d^3$ and $d^4$. In the opposite ends of each of these secondary links is pivoted a seaming-roll, $d^9$ and $d^{10}$, Figs. 3 and 5, so shaped as to press the seam to be operated on between it and the clamping-disk.

$d^{11}$ is a pocket in links $d^3$ and $d^4$, in which an adjusting compression-spring of sufficient strength to keep the seaming-rolls to their work is placed. This spring bears against the secondary link which carries the seaming-rolls, thereby keeping them to their work.

On sleeve $d$ are two pairs of projecting lugs, $d^{12}\ d^{12}$. (Shown in dotted lines in Fig. 3.) Between each pair of these lugs is pivoted a link, $d^{13}$. (Shown in Fig. 1.) In the middle of these links is a raised surface, which bears against a projection in the side of the secondary links $d^7$ and $d^8$. The lower end of these links carries an anti-friction roll, which works on the face of a conical sleeve.

$d^{14}$ represents the conical sleeve fitting over and sliding on the main sleeve $d$. This conical sleeve is movable vertically by means of a pin sliding in and through a hole in the hub of the gear-wheel, the lower end sliding on the cam which actuates the pin and sleeve.

$d^{15}$ represents the pin, $d^{16}$ the gear-wheel, and $d^{17}$ the stationary cam which actuates the pin and sleeve vertically to expand the depending links $d^{13}$, carrying the anti-friction rolls, thereby crowding the projecting surface on the links against the secondary links, carrying the seaming-rolls $d^9$ and $d^{10}$, thereby forcing them from the seam and disks to enable the operator to insert or remove a can.

$d^{18}$ represents a grooved cam of the desired shape to permit the can to be operated upon by the seaming-rolls. Cam or guide rolls $d^5$ and $d^6$ work in this cam-groove, thereby keeping the seaming-rolls to their work. $d^{19}$ represents a yoke for supporting and guiding the mechanism before described. This yoke has a vertical reciprocating motion, and works in suitable guides or ways in the frame. (Shown in Figs. 1 and 3 in dotted lines.)

$d^{20}$ $d^{20}$ represent caps for keeping the yoke in the guides or ways. The yoke is fitted over and rigidly attached to stud $D^2$, and is actuated by means of cam $D^6$ on rock-shaft $D^7$, operated by treadle $D^8$.

$d^{21}$ $d^{21}$ represent two counterbalance-levers pivoted to the frame at $d^{22}$ $d^{22}$. The inner ends of these levers bear against a projecting flange on sleeve $D^4$.

$d^{23}$ $d^{23}$ represent counter-weights. By means of the lever and weights the moving mechanism is nearly balanced, thereby lessening the labor of the operator and preventing concussion when the mechanism is moved downward.

$d^{16}$ is a gear-wheel fitted over and rigidly held on sleeve $d$. This gear-wheel meshes into a broad-face pinion-wheel, $d^{24}$, rigidly held on vertical shaft S. Through this mechanism a vertical motion is imparted to the sleeve-links, guide or cam rolls, and the seaming-rolls.

E represents a stationary centering and clamping disk of the required shape to fit the end of the can to be operated on. This disk is fitted and rigidly attached to stud E', Fig. 2. The upper end of this stud is let into and held in hub $E^2$ in the frame.

$e$ represents an intermittently-revolving sleeve fitted over and revolving on stud E'.

$e'$ and $e^2$ represent two arms on the lower end of sleeve $e$.

$e^3$ and $e^4$, Fig. 1, represent links pivoted in the extremity of the arms. These links are similar to those shown in Fig. 4. The opposite ends of these links carry a guide or cam roll. $e^5$ and $e^6$ represent these guides or cam rolls.

$e^7$ and $e^8$ represent secondary links, similar to that shown in Fig. 5. One end of these links is pivoted to links $e^3$ and $e^4$. The opposite end of the secondary links carry a seaming-roll of suitable size and shape for closing the seam. $e^9$ and $e^{10}$, Fig. 1, represent these seaming-rolls.

In links $e^3$ and $e^4$ is a pocket similar to $d^{11}$, Fig. 4, which carries a compression-spring, which bears against the secondary links, carrying the seaming-rolls, to keep them to their work, as before described. $e^{11}$, Fig. 1, represents one of the spring-pockets.

On sleeve $e$ are two pairs of projecting lugs, one pair of which is shown and marked $e^{12}$, Fig. 1. Between each pair of lugs is pivoted a link, one of which is shown in Fig. 1. $e^{13}$ is the link. In the middle of the link is a raised surface, which bears against a projection on the side of the secondary links $e^7$ and $e^8$. The upper ends of the links carry anti-friction rolls, which work on the face of a conical sleeve.

$e^{14}$ is the conical sleeve, sliding upon and revolving with the main sleeve $e$. This conical sleeve is kept in place by a compression-spring, $s'$ in Fig. 1. A downward motion is imparted to this sleeve by a pin sliding in and through a slot in the hub of the gear-wheel, the upper end of the pin projecting through the hub and sliding on a stationary cam. $e^{15}$ is the pin, $e^{16}$ is the gear-wheel, and $e^{17}$ is the stationary cam on which the pin slides. The office of the conical sleeve-pin and stationary cam is to expand the links $e^{13}$, which thereby actuate the links carrying the seaming-rolls, swinging them clear of the disk to enable the operator to insert or remove a can.

$e^{18}$ is a stationary cam of the desired shape to suit the contour of the can to be operated upon by the seaming-rolls. Cam or guide rolls $e^5$ and $e^6$ work in this grooved cam, keeping the seaming-rolls to their work.

Gear-wheel $e^{16}$ is fastened to sleeve $e$, the two revolving together on the stud E'. This gear-wheel meshes into pinion-wheel $e^{19}$, secured to upright shaft S, whereby the sleeve-links, cam or guide rolls, and seaming-rolls derive their rotary motion. On the upper end of shaft S is a beveled gear-wheel, which meshes into a similar gear-wheel on the horizontal driving-shaft. $S^2$ and $S^3$ represent the beveled gear-wheels, and $S^4$ the main driving-shaft.

P represents a clutch-pulley of well-known construction, which operates intermittently by means of a conical slide, $S^5$, tongue $S^6$, actuated by shifter $S^7$, attached to a shifter-rod, $S^8$, by means of a bell-crank, $S^9$, pivoted to the frame at $S^{10}$. By means of connecting-rod $S^{11}$ the lower end connects with a lever, $S^{12}$, pivoted loosely on rock-shaft $D^7$. Rigidly attached to the same rock-shaft $D^7$, and side by side with lever $S^{12}$, is a short crank, $S^{13}$, having a projecting pin, $S^{14}$, from the side thereof. This pin engages with the upper edge of lever $S^{12}$ during a part of the stroke.

By means of this mechanism the operator, by pressing on the treadle, centers and clamps the can between the disks, and by continuing the pressure brings the projecting pin $S^{14}$ in contact with lever $S^{12}$, thereby engaging the clutch-pulley and putting the machine in operation. After the seam has been closed on the can by the seaming-rolls traveling in contact with it the stationary arms $d^{17}$ and $e^{17}$ are so timed as to swing the seaming-rolls clear of the can and disks. Immediately following this a projecting cam on the lower side of gear-wheel $e^{16}$ comes in contact with lever $S^{16}$, pivoted to the frame at $S^{17}$, the opposite end playing between two collars, $S^{18}$ $S^{18}$, rigidly held on connecting-rod $S^{11}$, thereby imparting a vertical motion to the connecting-rod, by means of which the clutch is relieved and the rock-shaft $D^7$, with its cam $D^6$ and treadle $D^8$, is reversed, lowering the yoke $d^{19}$, and the mechanism therewith connected, thereby releasing the can, the machine remaining at rest.

In the drawings a square cam and disks are shown. Other shapes may be used. Two seaming-rolls are shown at each end of the can. One or more may be used.

What I claim as new, and desire to secure by Letters Patent, is—

1. A machine for closing the seams which secure the heads to the bodies of non-circular sheet-metal cans having, first, a pair of centering and clamping disks conforming to the shapes of the heads of the cans, and constructed and arranged to center, clamp, and retain the can stationary: second, one or more seaming-rolls, with mechanism whereby the same are retained against and revolved around the can throughout the entire length of the seam of whatever contour the seam may be.

2. In a machine for closing the seams which secure the heads to the bodies of non-circular cans of sheet metal, the following mechanisms in combination: first, a pair of centering and clamping disks conformed to the shapes of the heads of the cans, and means for operating them together to center, clamp, and retain the can stationary; second, mechanism whereby seaming-rolls are retained against and revolved around the can throughout the entire length of the seam of whatever contour the seams may be; and, third, mechanism whereby, first, the machine is set in action, and, secondly, whereby the seaming-rolls are unset, the can unclamped, and the machine stopped.

3. In a machine for closing the seams of sheet-metal cans, the combination of the seaming-rolls revolved around centering and clamping disks, spring-sleeves, conical slides, sliding pins, together with stationary cams for operating the pins, whereby the rolls are set and unset.

4. In a machine for closing the seams of sheet-metal cans, the combination, with the seaming-rolls revolved around centering and clamping disks, and mechanism whereby the clamping disk, rolls, and cams are alternately lifted and dropped, of a treadle, $D^8$, rock-shaft $D^7$, cam $D^6$, balancing-levers $d^{21}$, and adjustable weights $d^{23}$, substantially as shown and described.

5. In a machine for closing the seams of sheet-metal cans, the combination of the mechanism for throwing the clutch into operation and operating the clamps for retaining the can, a lever connected with said clutching and clamping mechanisms, and a cam connected to and operated with the seaming-rolls, whereby upon the requisite number of revolutions of the seaming-rolls around the can the clutch is thrown out of operation and the can is unclamped.

6. The herein-described seaming-machine having the following combinations: first, a pair of centering and clamping disks conforming to the heads of the can and constructed to center and retain the can stationary; second, one of said disks having a reciprocal motion to allow the can to be inserted and removed; third, a pair of rotating sleeves carrying links, and guide and seaming rolls constructed to be rotated by and with the sleeve; fourth, a stationary cam to guide and keep the seaming-rolls to their work, with the aid of spring-pressure, with means for rotating the sleeve-links, and the guide and cam rolls; fifth, dependent links constructed to be rotated with the sleeve and to be expanded by conical sleeves, with reciprocating motion actuated by pins, gear-wheels, and stationary cams, whereby the seaming-rolls are brought to and removed from their work, with mechanism to actuate the same.

EDMUND JORDAN.

Witnesses:
EDWIN H. RISLEY,
WM. G. WILLS.